US008353014B2

(12) United States Patent
Bader et al.

(10) Patent No.: US 8,353,014 B2
(45) Date of Patent: *Jan. 8, 2013

(54) DYNAMIC DUAL PERMISSIONS-BASED DATA CAPTURING AND LOGGING

(75) Inventors: Lauren L. Bader, Cary, NC (US); Julia V. Myers, Raleigh, NC (US); James F. Schenck, Wake Forest, NC (US); Kevin L. Scheiern, Cary, NC (US); William C. Wimer, II, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/871,797

(22) Filed: Aug. 30, 2010

(65) Prior Publication Data

US 2010/0325738 A1 Dec. 23, 2010

Related U.S. Application Data

(63) Continuation of application No. 11/167,533, filed on Jun. 27, 2005, now Pat. No. 7,788,706.

(51) Int. Cl.
*H04L 29/06* (2006.01)
*G06F 17/00* (2006.01)
*G06F 7/04* (2006.01)
*G06F 17/30* (2006.01)
*G06F 15/16* (2006.01)
*G08B 23/00* (2006.01)
*G06Q 10/00* (2012.01)
*G06Q 50/00* (2012.01)

(52) U.S. Cl. ......... 726/4; 726/1; 726/22; 705/2; 705/44; 709/202; 709/203; 709/227

(58) Field of Classification Search ....................... None
See application file for complete search history.

(56) References Cited

U.S. PATENT DOCUMENTS

| | | | | |
|---|---|---|---|---|
| 6,928,291 | B2* | 8/2005 | Yiu et al. | 455/456.1 |
| 7,013,310 | B2* | 3/2006 | Messing et al. | 707/709 |
| 7,257,835 | B2* | 8/2007 | Jones | 726/1 |
| 7,269,853 | B1* | 9/2007 | Dunn | 726/27 |
| 7,356,836 | B2* | 4/2008 | Beilinson et al. | 726/4 |
| 7,356,840 | B1* | 4/2008 | Bedell et al. | 726/13 |
| 2003/0120601 | A1* | 6/2003 | Ouye et al. | 705/51 |
| 2004/0001573 | A1* | 1/2004 | Gusler et al. | 379/67.1 |
| 2006/0041935 | A1* | 2/2006 | Conley et al. | 726/11 |
| 2006/0090202 | A1* | 4/2006 | Liu et al. | 726/17 |
| 2006/0282878 | A1* | 12/2006 | Stanley et al. | 726/1 |

* cited by examiner

*Primary Examiner* — Shin-Hon Chen
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to application data logging and provide a novel and non-obvious method, system and computer program product for capturing and logging application data. In an embodiment of the invention, a method for capturing and logging application data can include consulting both administrative permissions for capturing and logging application data, and also user permissions for capturing and logging application data. Subsequently, application data can be captured and logged only if permitted by the administrative permissions and the user permissions. In this regard, it can be determined from either or both of the permissions whether capturing and logging of application data is permitted generally, and also a type or portion of the application data that is permitted to be captured and logged.

15 Claims, 2 Drawing Sheets

DYNAMIC DUAL PERMISSIONS-BASED DATA CAPTURING AND LOGGING

CROSS-REFERENCE TO RELATED APPLICATIONS

This application is a Continuation of U.S. application Ser. No. 11/167,533, filed on Jun. 27, 2005, now U.S. Pat. No. 7,788,706, which is incorporated herein by reference in its entirety.

BACKGROUND OF THE INVENTION

1. Field of the Invention

The present invention relates to the field of application administration and more particularly to the field of data capturing and logging during application administration.

2. Description of the Related Art

Conventional computing applications range from miniscule compilations of logic which execute in a stand-alone environment, to globally distributed applications hosted across multiple, dispersed computing platforms. For smaller, contained applications, the administration of the application can be minimized and the responsibility for maintaining the application can rest with the end user in most circumstances. In contrast, for larger, distributed applications, the administration of the application can be a complex and time consuming task and, in consequence, the responsibility for maintaining the application can rest with one or more expert administrators.

Administering a larger, distributed application often can involve the capture and logging of data produced in association with the operation of the application. In this regard, application administrators can collect the data in order to confirm the proper operation of the application, and to troubleshoot application execution problems. Yet, in some circumstances, the data collected by the administrator can be of a sensitive nature. Mechanisms presently exist to secure access to sensitive data by limiting access to sensitive data to particular users or user classifications. However, these mechanisms are developed in conjunction with the application itself and without consideration for those who administer the application.

In the application setting, a more restrictive policy towards data access can be preferred to secure access to the data. In contrast, in the application administration setting, a more liberal policy towards data access can be preferred to so as to provide the maximum opportunity to assess the efficacy of the operation of the application. Thus, many have resorted to "hard coding" the capturing and logging of data for administrative purposes to circumvent the restrictive data access policies of the underlying application. Of course, to "hard code" data capturing and logging logic can inhibit the reusability of the code and can introduce maintenance difficulties for those maintaining the application administrative logic.

Importantly, by statically coding the logging and capturing function in an application, the determination of whether or not to capture and log application data can be based upon the data itself. Yet, in some applications it can be desirable to log data selectively based upon the user associated with the data. Also, changes to the desirability of logging data, when hard coded, is limited to decision making performed by the application developer and bears no relationship to the preferences of the user. Finally, hard coding the data logging function does not permit changes in the capturing and logging decision without also requiring a recoding of the application.

BRIEF SUMMARY OF THE INVENTION

Embodiments of the present invention address deficiencies of the art in respect to application data logging and provide a novel and non-obvious method, system and computer program product for capturing and logging application data. In an embodiment of the invention, a method for capturing and logging application data can include consulting both administrative permissions for capturing and logging application data, and also user permissions for capturing and logging application data. Subsequently, application data can be captured and logged only if permitted by the administrative permissions and the user permissions. In this regard, it can be determined from either or both of the permissions whether capturing and logging of application data is permitted generally, and also a type or portion of the application data that is permitted to be captured and logged.

In another embodiment, a data processing system for capturing and logging application data can include a data log configured to stored logged application data. The system also can include a set of dual permissions comprising administrative permissions and user permissions specifying whether logging application data from an application is permitted. Finally, the system can include data capturing and logging logic configured for coupling to each of the data log, an application, and the set of dual permission. The data capturing and logging logic can include program code enabled to log captured application data from the application only if permitted by the set of dual permission.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamic dual-permissions based data capturing and logging. In accordance with an embodiment of the present invention, data capturing and logging can be selectively performed for data based upon dynamically applied permissions specified both by an application administrator and an application user associated with the data. Specifically, initially it can be determined whether application data capturing and logging is permitted according to the preferences of the application administrator. Subsequently, only if application data capturing and logging is permitted by the administrator preferences, it can be determined whether privacy preferences for a user associated with the data permit the capturing and logging of associated data. If so, data associated with the user can be captured and logged.

Figure 1:
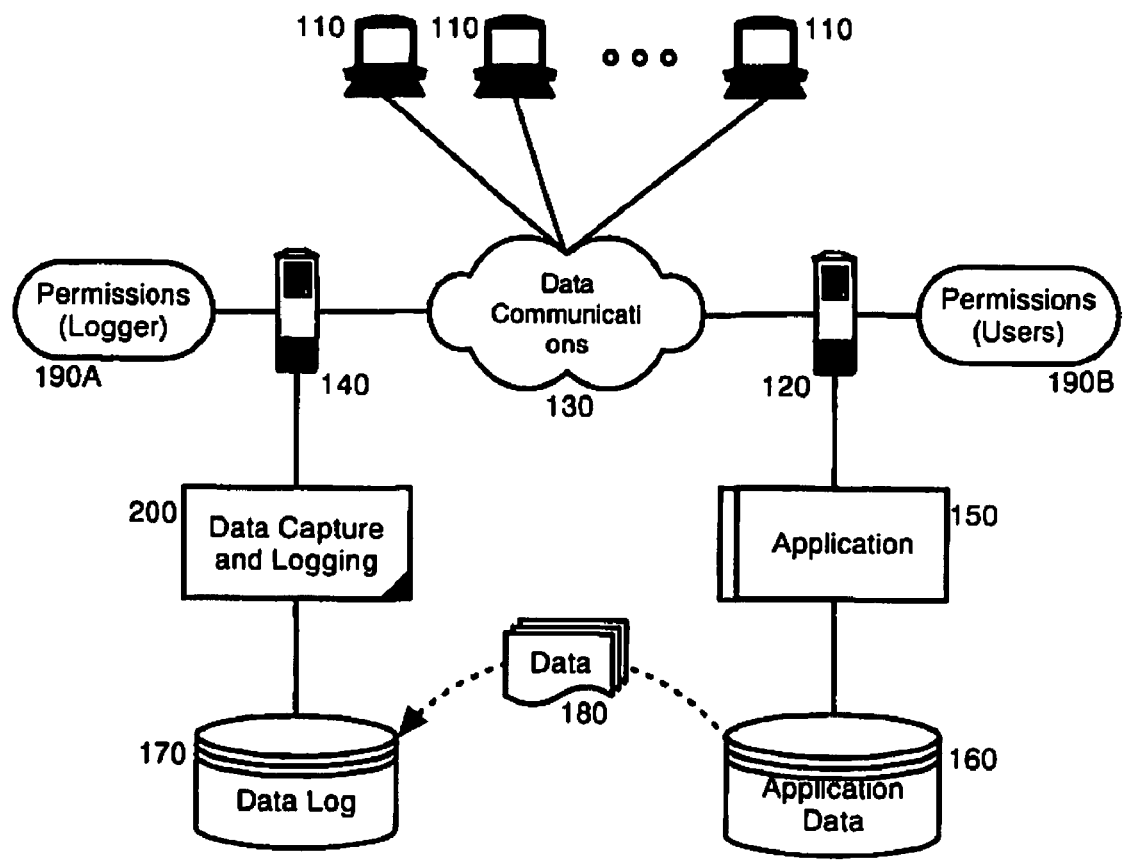
FIG. 1 is a schematic illustration of a data processing system configured for dynamic dual-permissions based data capturing and logging; and, FIG. 2 is a flow chart illustrating a process for dynamic dual-permissions based data capturing and logging.

In further illustration of an embodiment of the invention, FIG. 1 is a schematic illustration of a data processing system configured for dynamic dual-permissions based data capturing and logging. The system can include an application 150 hosted within one or more host computing platforms 120 (only a single host computing platform shown for illustrative simplicity). The application 150 can be a stand-alone application, or the application 150 can be a distributed application as shown in the illustration which can be accessed by one or more end users 110 over a data communications network 130. In either circumstance, the application 150 can produce and manage application data stored within a data store of application data 160.

Data capturing and logging logic 200 hosted within a host computing platform 140 can be communicatively coupled to the application 150. The data capturing and logging logic 200 can be coupled to the application 150 in a number of ways, for example from within the same, host operating environment, across different process address spaces in the same or different computing platforms, or through inter-process communications across the data communications network 130 as shown in the illustration. Regardless, the data capturing and logging logic 200 can be configured to selectively capture and log data 180 in a data log 170 for use in application administration according to dual permissions specified by administrated permissions 190A and user permissions 190B.

Specifically, the data capturing and logging logic 200 can consult the administrative permissions 190A to determine whether logging and capturing of the data 180 is permitted generally. Optionally, the administrative permissions 190A further can specify what types of the data 180 are to be captured and logged and which types of the data 180 are not to be captured and logged. The data capturing and logging logic 200 further can consult the user permissions 190B for the users to determine whether logging and capturing of those portions of the data 180 associated with respective users is permitted. Again, optionally, the user permissions 190B further can specify what types of the data 180 are to be captured and logged and which types of the 180 are not to be captured and logged.

Figure 2:
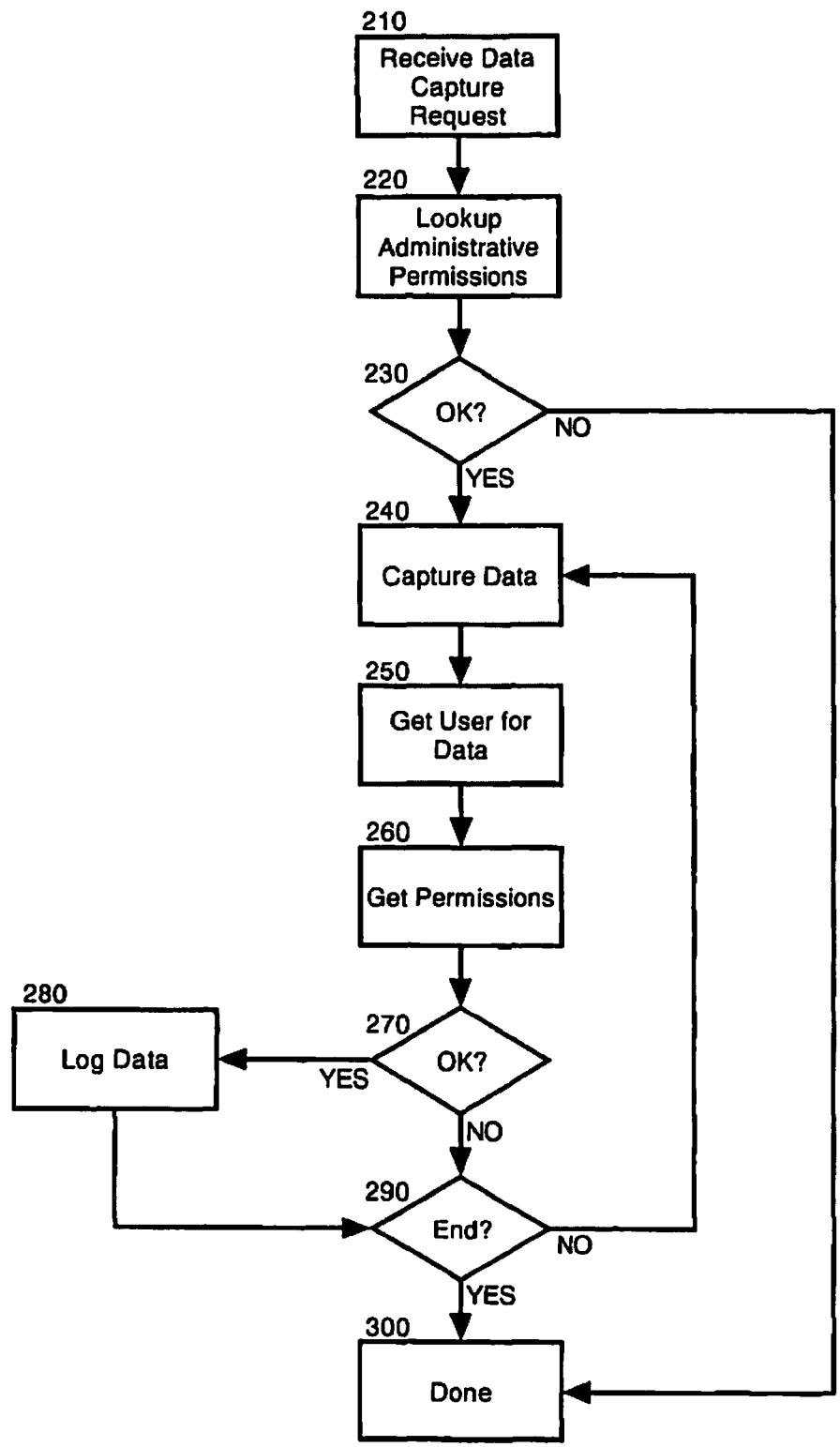

In further illustration, FIG. 2 is a flow chart illustrating a process for dynamic dual-permissions based data capturing and logging. Beginning in block 210, a data capture request can be received to capture and log data for a coupled application. In block 220, the administrative permissions for data capturing and logging can be consulted to determine whether data capturing and logging is permitted, and further what portions or types of the application data can be captured and logged. In decision block 230, if the administrative permissions do not permit the capturing and logging of the data for the application, the process can end in block 300. Otherwise, the process can continue through block 240.

In block 240, data for the application can be captured. In block 250, an associated user or user class can be determine for the captured data and in block 260 the user permissions for the user or user class can be retrieved. In decision block 270, it can be determined whether the user permissions allow for the logging and capturing of data associated with the user or user class. Optionally, it further can be determined what portions of the data or what types of data can be captured and logged for the user and user class. If the captured data meets both criteria in decision block 270, in block 280 the application data (or a permitted portion) of the application data can be logged. The data capturing and logging process can continue through decision block 290 returning to block 240 until it is decided to no longer capture and log data.

The skilled artisan will recognize several resulting aspects of the foregoing methodology. First, the determination of whether to log captured data for a particular user (and what types or portions of application to log) can change dynamically and globally merely by modifying the user permissions, the administrative permissions, or both. No re-coding of the application will be required. Furthermore, the underlying application can change without impacting the capturing and logging process. Also, the dual nature of the permissions allows both the end users and the application administrator to control access to the logging of sensitive data. Finally, the dual permissions apply not to the data exclusively, but to the users of the data which is more closely aligned with the privacy interests addressed herein which can vary for the same application data from user to user.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adaptor may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method, implemented by a computer data processing system, for capturing and logging application data generated by an application comprising:
consulting both administrative permissions for capturing and logging application data and user permissions for capturing and logging application data to determine whether capturing and logging of the application data is permitted and to further determine a type of application data permitted to be captured and logged, wherein the administrative permissions and the user permissions are dynamically modifiable; and
capturing and logging the type of application data only upon being permitted by both said administrative permissions and said user permissions.

2. The method of claim 1, wherein said consulting comprises:
further identifying from said administrative permissions a portion of application data permitted to be captured and logged.

3. The method of claim 2, wherein said capturing and logging application data comprises
capturing and logging only the portion of said application data permitted by said administrative permissions.

4. The method of claim 1, wherein said consulting comprises:
further identifying from said user permissions a portion of application data permitted to be captured and logged.

5. The method of claim 4, wherein said capturing and logging application data comprises
capturing and logging only the portion of said application data permitted by said user permissions.

6. The method of claim 1, wherein said capturing and logging application data comprises:
establishing a communicatively link with the application over a data communications network;
determining from said administrative permissions whether capturing and logging data in said communicatively linked application is permitted.

7. A data processing system for capturing and logging application data comprising:
a data log configured to stored logged application data;
a computer usable storage medium having stored therein a set of dual permissions comprising administrative permissions and user permissions, the set of dual permissions specifying whether logging application data from an application is permitted and a type of application data permitted to be captured and logged, wherein the administrative permissions and the user permissions are dynamically modifiable; and
data capturing and logging logic configured to couple to each of said data log, the application, and said set of dual permission, said data capturing and logging logic configured to
capture and log the type of application data from said application only upon being permitted by both said administrative permissions and said user permissions.

8. The data processing system of claim 7, wherein
said set of dual permissions further specifies a portion of application data which is permitted to be logged.

9. The data processing system of claim 7, wherein
said data capturing and logging logic is communicatively coupled to said application over a data communications network.

10. A computer program product comprising a computer usable storage medium having stored therein computer usable program code for capturing and logging application data generated by an application, the computer usable program code, which when executed by a computer hardware system, causes the computer hardware system to perform:
consulting both administrative permissions for capturing and logging application data and user permissions for capturing and logging application data to determine whether capturing and logging of the application data is permitted and to further determine a type of application data permitted to be captured and logged, wherein the administrative permissions and the user permissions are dynamically modifiable; and
capturing and logging the type of application data only upon being permitted by both said administrative permissions and said user permissions.

11. The computer program product of claim 10, wherein said consulting comprises:
further identifying from said administrative permissions a portion of application data permitted to be captured and logged.

12. The computer program product of claim 11, wherein said capturing and logging application data comprises
capturing and logging only the portion of said application data permitted by said administrative permissions.

13. The computer program product of claim 10, wherein said consulting comprises:
further identifying from said user permissions a portion of application data permitted to be captured and logged.

14. The computer program product of claim 13, wherein said capturing and logging application data comprises
capturing and logging only the portion of said application data permitted by said user permissions.

15. The computer program product of claim 10, wherein said capturing and logging application data comprises:
establishing a communicatively link with the application over a data communications network;
determining from said administrative permissions whether capturing and logging data in said communicatively linked application is permitted.

* * * * *